US012679227B2

(12) United States Patent
Sugimura

(10) Patent No.: US 12,679,227 B2
(45) Date of Patent: Jul. 14, 2026

(54) ROLLING COMPACTION VEHICLE

(71) Applicant: HONDA MOTOR CO., LTD., Tokyo (JP)

(72) Inventor: Kentaro Sugimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 425 days.

(21) Appl. No.: 18/570,971

(22) PCT Filed: Jun. 22, 2021

(86) PCT No.: PCT/JP2021/023642
§ 371 (c)(1),
(2) Date: Dec. 15, 2023

(87) PCT Pub. No.: WO2022/269766
PCT Pub. Date: Dec. 29, 2022

(65) Prior Publication Data
US 2024/0286496 A1 Aug. 29, 2024

(51) Int. Cl.
*E01C 19/28* (2006.01)
*B60L 50/60* (2019.01)

(52) U.S. Cl.
CPC ............ *B60L 50/66* (2019.02); *E01C 19/282* (2013.01); *E01C 19/285* (2013.01); *B60L 2200/40* (2013.01); *E01C 2301/00* (2013.01)

(58) Field of Classification Search
CPC .. E01C 19/282; E01C 19/285; E01C 2301/00; B60L 50/66; B60L 2200/40
USPC .......................................... 404/117, 122, 131
See application file for complete search history.

(56) References Cited

U.S. PATENT DOCUMENTS 4,964,753 A * 10/1990 Ciminelli ................ E02D 3/026
                                                        404/117
6,409,425 B1 * 6/2002 Okabe ................... E01C 19/283
                                                        404/117
7,497,642 B2 * 3/2009 Raymond ............... E01C 19/26
                                                        404/124
(Continued)

FOREIGN PATENT DOCUMENTS

JP         10-181651 A      7/1998
JP       2000-203476 A      7/2000
              (Continued)

OTHER PUBLICATIONS

International Search Report Corresponding to International Application No. PCT/JP2021/023642, dated Sep. 14, 2021, 2 pages.
(Continued)

*Primary Examiner* — Raymond W Addie
(74) *Attorney, Agent, or Firm* — Rankin, Hill & Clark LLP

(57) ABSTRACT

A vehicle body of a rolling compaction vehicle is provided with a battery case and a motor. A removable battery is removably housed in an insertion hole of the battery case. The battery case is in an inclined position. This inclination causes an opening of the insertion hole to face an outer edge of the vehicle body, and causes a wall portion that holds back the removable battery to face the inside of the vehicle body. Here, the lower end of the wall portion is located at a position lower than the lower end of the opening. Electric power of the removable battery is supplied to the motor.

7 Claims, 7 Drawing Sheets

(56)                       References Cited

U.S. PATENT DOCUMENTS

| | | | | |
|---|---|---|---|---|
| 8,770,887 | B1 * | 7/2014 | Geier ................... | E01C 19/286 |
| | | | | 200/61.54 |
| 9,334,612 | B2 * | 5/2016 | Marshall .............. | E01C 19/262 |
| D760,301 | S  * | 6/2016 | Alberti .......................... | D15/20 |
| 2013/0302089 | A1 | 11/2013 | Sina | |

FOREIGN PATENT DOCUMENTS

| | | | |
|---|---|---|---|
| JP | 2001-169602 | A | 6/2001 |
| JP | 2012-223124 | A | 11/2012 |
| JP | 2013-220908 | A | 10/2013 |
| JP | 2013-234564 | A | 11/2013 |
| JP | 2018-149009 | A | 9/2018 |
| JP | 2019-002199 | A | 1/2019 |
| JP | 2019-068720 | A | 4/2019 |
| JP | 2019-094669 | A | 6/2019 |

OTHER PUBLICATIONS

Japanese Office Action issued Dec. 3, 2024 in corresponding Japanese application No. 2023-529285; English machine translation included (8 pages).
Japanese Office Action issued Aug. 6, 2024 in corresponding Japanese application No. 2023-529285; English translation included (8 pages).

* cited by examiner

F I G. 1
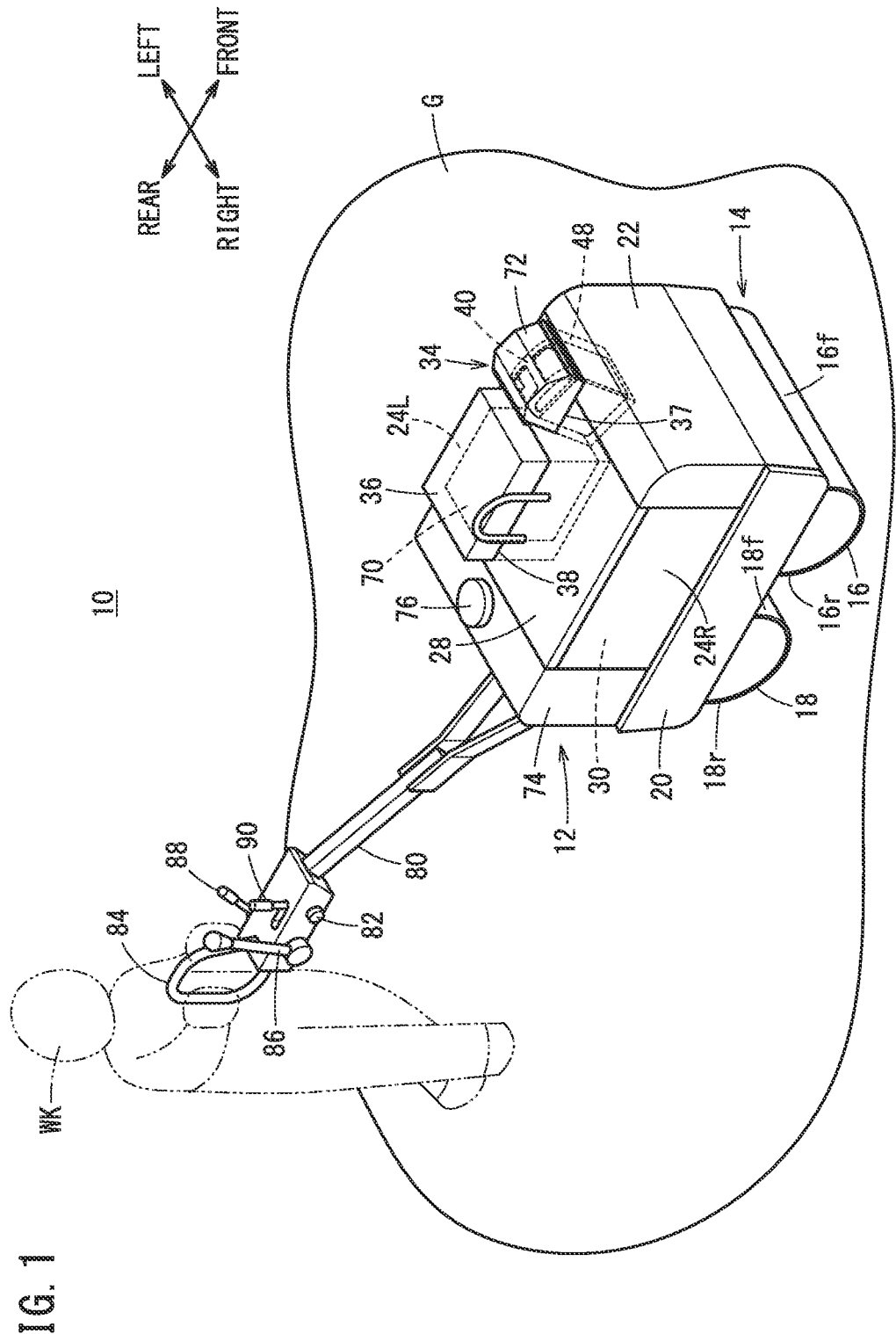

REAR ←→ FRONT

34

72

60

52

50

46    64

56

58

62

48

42

40

54

REAR

RIGHT ←———→ LEFT

FRONT

100

F I G. 7
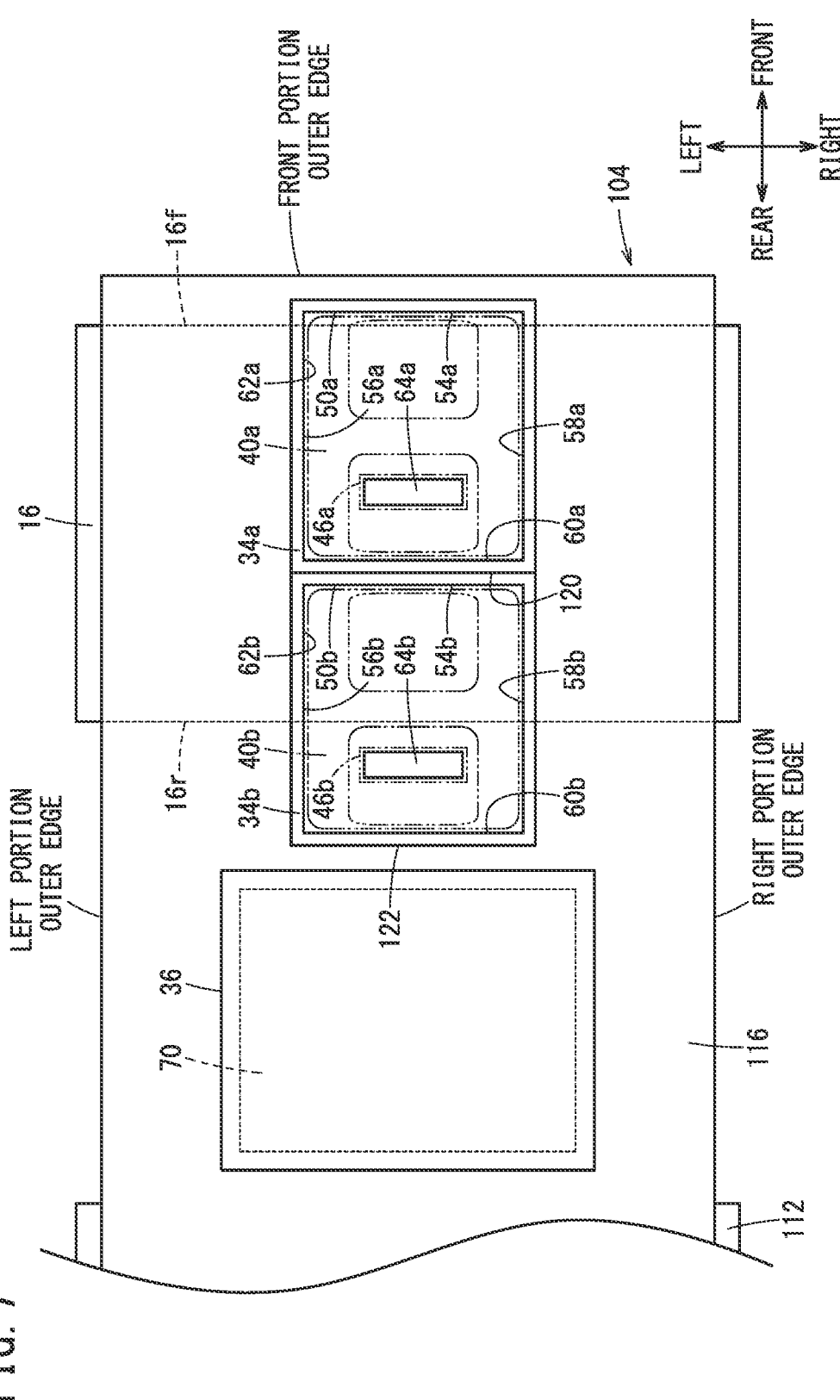

ROLLING COMPACTION VEHICLE

TECHNICAL FIELD

The present invention relates to a rolling compaction vehicle that carries out compaction of a road surface using a frontward rolling compaction wheel and a rearward rolling compaction wheel in pavement work or the like.

BACKGROUND ART

A rolling compaction vehicle is widely used in pavement work or the like. More specifically, such a rolling compaction vehicle is equipped with a frontward rolling compaction wheel and a rearward rolling compaction wheel. For example, a road surface immediately after the pavement work is implemented thereon is compacted by the frontward rolling compaction wheel and the rearward rolling compaction wheel. As a result, the road surface is leveled.

As a typical example of a rolling compaction vehicle, there may be cited the riding type rolling compaction vehicle disclosed in JP 2013-234564 A. In this case, the vehicle body is provided with a driver's seat for an operator to ride on. Further, a non-riding type rolling compaction vehicle in which an operator pushes the vehicle body in a frontward direction from the rear is also known. As described in JP 2019-094669 A, this type of rolling compaction vehicle is also referred to as a hand-guided roller. In any of such rolling compaction vehicles, an engine is mounted on the vehicle body. The engine serves as a drive source that drives the frontward rolling compaction wheel and the rearward rolling compaction wheel.

SUMMARY OF THE INVENTION

From the standpoint of reducing the load on the environment, it may be considered to use a motor as the drive source instead of an engine. In this case, a battery is mounted on the vehicle body. Electrical power is supplied to the motor from the battery.

In the case of a built-in battery that is incapable of being replaced, at a time when a residual charge capacity (SOC) of the battery is low and charging of the battery is carried out, the rolling compaction vehicle is connected to an external power source (for example, a commercial power source) via a charging cable or the like. In this state, it becomes difficult for the rolling compaction vehicle to be made to travel. Accordingly, it becomes difficult to carry out compaction of the road surface. In order to avoid such a problem, it may be considered to adopt and use an attachable and detachable battery which is capable of being replaced. In this case, at a time when the SOC of the attachable and detachable battery is lowered accompanying the operation of the rolling compaction vehicle, the battery is replaced with another attachable and detachable battery that has been already charged. In accordance with this feature, operation of the rolling compaction vehicle can be continued.

In such a configuration, it is necessary to perform an operation to remove the attachable and detachable battery whose SOC has decreased from the vehicle body, and to attach the charged attachable and detachable battery to the vehicle body. Incidentally, an attachable and detachable battery with a relatively large discharge capacity is generally large in scale. Such a large scale attachable and detachable battery is a quite heavy object. When attaching and detaching such a heavy attachable and detachable battery does not proceed smoothly, the burden imposed on the operator becomes large.

The present invention has the object of solving the aforementioned problem.

According to one embodiment of the present invention, there is provided a rolling compaction vehicle equipped with a vehicle body, and a frontward rolling compaction wheel and a rearward rolling compaction wheel that are provided on a lower portion of the vehicle body, the rolling compaction vehicle comprising; a battery case provided in the vehicle body at a higher position than the frontward rolling compaction wheel and the rearward rolling compaction wheel, and configured to attachably and detachably accommodate an attachable and detachable battery; and a motor provided in the vehicle body and configured to drive the frontward rolling compaction wheel and the rearward rolling compaction wheel with electrical power supplied from the attachable and detachable battery, wherein an insertion hole configured to accommodate the attachable and detachable battery is formed in the battery case, an opening through which the attachable and detachable battery is inserted into the insertion hole or removed from the insertion hole is formed at a first end of the insertion hole, and a second end of the insertion hole is a wall portion configured to block and hold back the attachable and detachable battery, and the battery case is placed in an inclined posture in which the opening faces an outer edge of the vehicle body and the wall portion faces an interior of the vehicle body, and a lower end of the wall portion is at a lower position than a lower end of the opening.

In the present invention, the battery case in which the attachable and detachable battery is attachably and detachably accommodated is provided at a higher position than the frontward rolling compaction wheel and the rearward rolling compaction wheel. Therefore, the weight of the battery case and the weight of the attachable and detachable battery that is accommodated in the battery case are added to the frontward rolling compaction wheel or the rearward rolling compaction wheel. Accordingly, a sufficient load is applied to the road surface via the frontward rolling compaction wheel or the rearward rolling compaction wheel. Therefore, it is easy to rollingly compact or to level the road surface or the like.

Further, the battery case is inclined in a manner so that the opening of the battery case faces the outer edge of the vehicle body. Therefore, compared to a situation in which the battery case is not inclined, the opening becomes disposed at a lower position and closer in proximity to the worker. Accordingly, at a time when the worker inserts or removes the attachable and detachable battery from the exterior of the vehicle body into or from the insertion hole of the battery case, the moving distance for lifting up the attachable and detachable battery from the ground surface or the like to the battery case, and the moving distance for lowering the attachable and detachable battery from the battery case to the ground surface or the like, are made shorter.

Furthermore, since the battery case is inclined, the insertion hole is also inclined. In this case, a portion of the inner wall bears the weight of the attachable and detachable battery. Therefore, insertion and removal of the attachable and detachable battery is facilitated.

BRIEF DESCRIPTION OF DRAWINGS

FIG. 1 is an overall schematic perspective view of a non-riding type rolling compaction vehicle (a hand-guided type vibrating roller) according to a first embodiment of the present invention;

FIG. 7 is a schematic plan view of a loading section of the tandem type road roller.

DETAILED DESCRIPTION OF THE INVENTION

Figure 2:
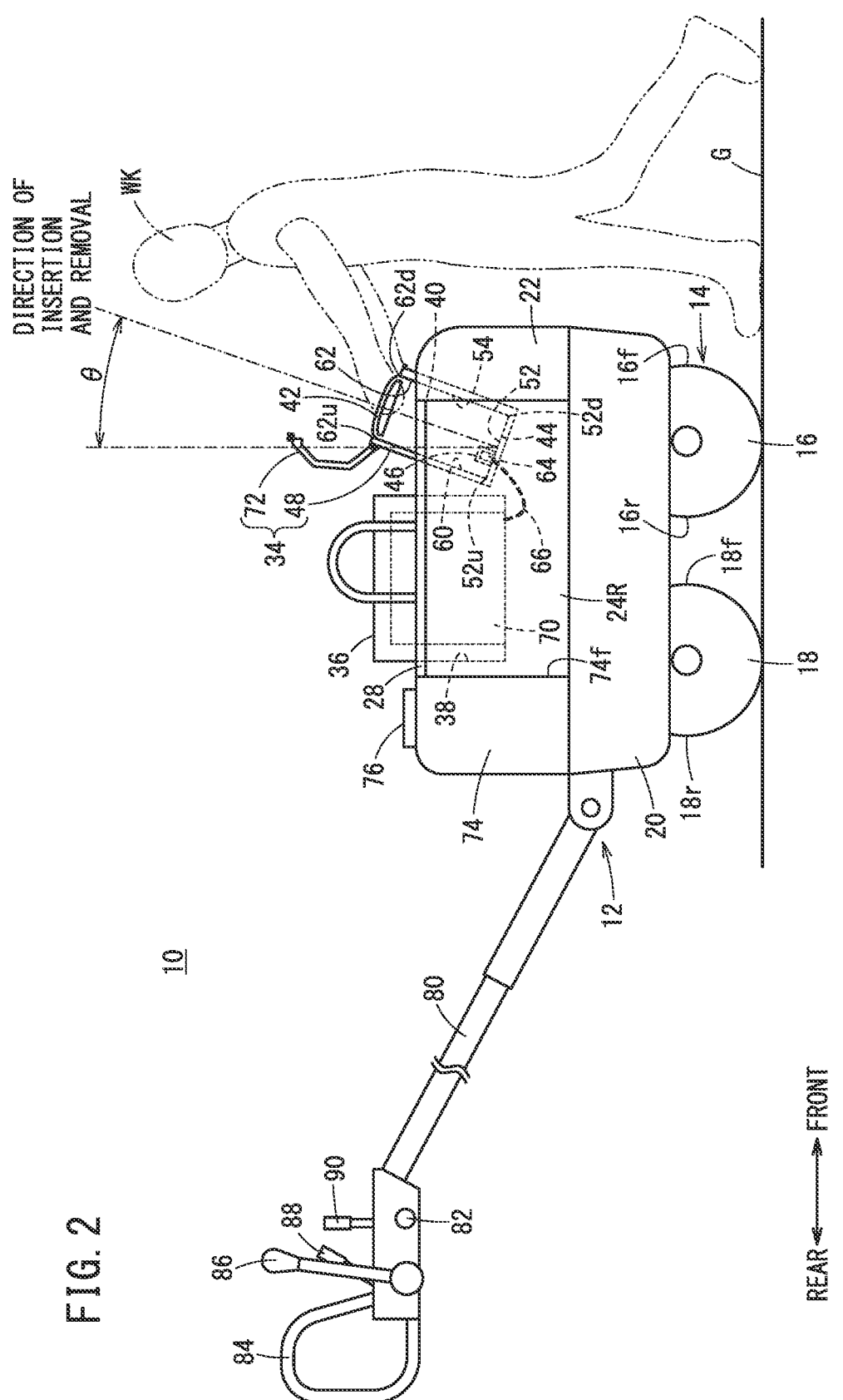
FIG. 2 is a schematic right side view of the hand-guided type vibrating roller.

In the description given below, the terms "front", "rear", "left", and "right" refer to a front direction, a rear direction, a left direction, and a right direction of a worker who operates a rolling compaction vehicle. The term "front-rear direction" is synonymous with a "vehicle lengthwise direction", and the term "left-right direction" is synonymous with a "widthwise direction". Moreover, the term "higher position" represents a height position where a straight-line distance from the ground surface (road surface) is relatively large. The term "lower position" represents a height position where a straight-line distance from the ground (road surface) is relatively small. The terms higher position and lower position do not necessarily mean that these positions are arranged vertically above and below one another.

Initially, a first embodiment of the present invention will be described using, as an example, a hand-guided type vibrating roller. The hand-guided type vibrating roller is one type of a non-riding type rolling compaction vehicle.

As shown in FIG. 1, a hand-guided type vibrating roller 10 includes a loading vehicle body 12. A traveling member 14 is provided on a lower part of the loading vehicle body 12. The traveling member 14 includes a frontward roller 16 positioned at a front portion of the loading vehicle body 12, and a rearward roller 18 positioned at a rear portion of the loading vehicle body 12. At a time when the frontward roller 16 and the rearward roller 18 rotate from the rear toward the front in a state of being in contact with a road surface G, the hand-guided type vibrating roller 10 moves forward. Conversely, at a time when the frontward roller 16 and the rearward roller 18 rotate from the front toward the rear in a state of being in contact with the road surface G, the hand-guided type vibrating roller 10 moves rearward.

The loading vehicle body 12 includes a base frame 20. A front cover 22, a left side cover 24L, and a right side cover 24R are attached to the base frame 20. Furthermore, a top plate member 28 is removably connected to upper ends of the left side cover 24L and the right side cover 24R. In the interior of the loading vehicle body 12, an internal space 30 is formed by the front cover 22, the left side cover 24L, the right side cover 24R, and the top plate member 28. In the internal space 30, a vibration generating mechanism for the purpose of vibrating the frontward roller 16 and the rearward roller 18 is accommodated in a right portion of the loading vehicle body 12. More specifically, the frontward roller 16 and the rearward roller 18 are vibrated by the vibration generating mechanism, and thereby compact the road surface G. In this manner, the frontward roller 16 serves as a frontward rolling compaction wheel and the rearward roller 18 serves as a rearward rolling compaction wheel. Moreover, it should be noted that, because a vibration generating mechanism in the non-riding type rolling compaction vehicle is well known, such a mechanism is not shown.

In the internal space 30, a battery case 34 is disposed in a left frontward portion of the loading vehicle body 12. Further, in the internal space 30, a motor housing 36 is disposed in a left rightward portion of the loading vehicle body 12. More specifically, the battery case 34 and the motor housing 36 are arranged in parallel and adjacent to each other along the front-rear direction. The battery case 34 is exposed from the top plate member 28 through a cutout 37 formed in the top plate member 28. The motor housing 36 is exposed from the top plate member 28 through an insertion opening 38 formed in the top plate member 28. Alternatively, both the battery case 34 and the motor housing 36 may be entirely accommodated within the internal space 30.

As shown in FIG. 2, an attachable and detachable battery 40 is attachably and detachably accommodated in the battery case 34. Concerning the attachable and detachable battery 40, a brief description thereof will be given.

The attachable and detachable battery 40 has a substantially rectangular parallelepiped shape, similar to that shown in FIG. 1 of JP 2019-068720 A. A handle portion 42 to be grasped by a worker WK is provided on one end of the attachable and detachable battery 40 in the longitudinal direction thereof. The worker WK grasps the handle portion 42, for example, at a time when accommodating the attachable and detachable battery 40 in the battery case 34, or at a time when transporting the attachable and detachable battery 40. The other end thereof in the longitudinal direction where the handle portion 42 is not provided is a substantially flat bottom surface 44. A first connector 46 of a female type is provided on the bottom surface 44.

Figure 3:
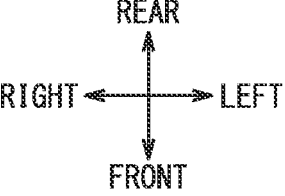
FIG. 3 is a schematic plan view, as seen from above, of a battery case mounted on the vehicle body of the hand-guided type vibrating roller.

As shown in detail in FIG. 3, the battery case 34 includes a case main body 48. An insertion hole 50 in which the attachable and detachable battery 40 is capable of being accommodated is formed in the case main body 48. The insertion hole 50 exhibits a shape like that of a rectangular parallelepiped that has been hollowed out. Therefore, the insertion hole 50 is formed to have an inner wall made up of five walls, namely, a bottom wall 52, a lower wall 54, a left side wall 56, a right side wall 58, and an upper wall 60. More specifically, a lower end (second end) of the insertion hole 50 is the bottom wall 52 that makes up a wall portion. Further, at an upper end (first end) of the insertion hole 50, an opening 62 through which the attachable and detachable battery 40 is inserted into the insertion hole 50 or removed from the insertion hole 50 is formed.

Figure 4:
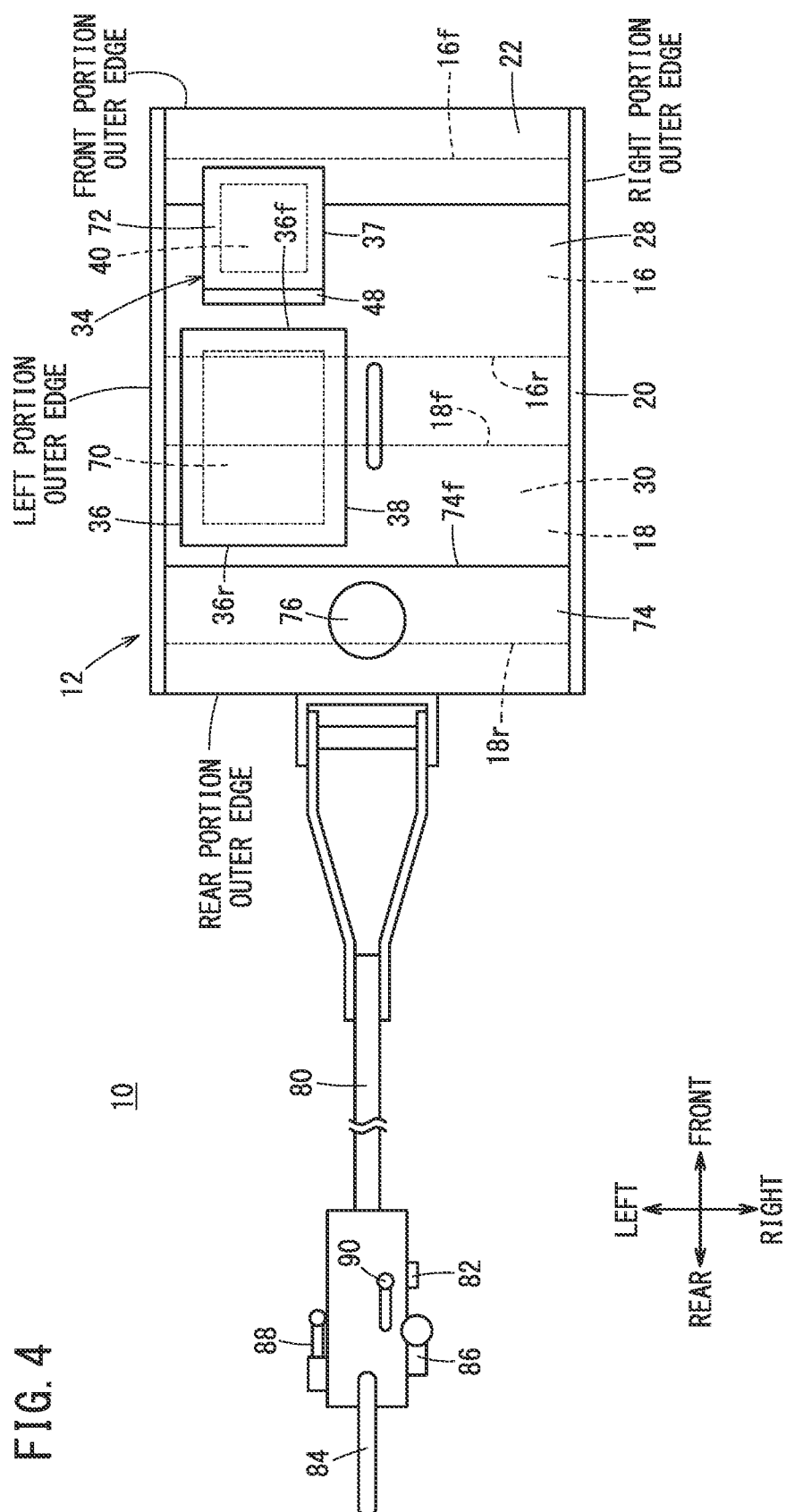
FIG. 4 is a schematic plan view of the hand-guided type vibrating roller.

As shown in FIG. 2 and FIG. 4, the opening 62 of the battery case 34 faces a front portion outer edge of the loading vehicle body 12. Further, the bottom wall 52 of the battery case 34 faces the internal space 30 (the interior of the loading vehicle body 12). Therefore, a front end of the lower wall 54 corresponds to a lower end 62d of the opening 62. A front end of the upper wall 60 corresponds to an upper end 62u of the opening 62. Further, a rear end of the lower wall 54 corresponds to a lower end 52d of the bottom wall 52. A rear end of the upper wall 60 corresponds to an upper end 52u of the bottom wall 52. The lower end 62d of the opening 62 is positioned at a higher position and more frontward than the lower end 52d of the bottom wall 52. The upper end 62u of the opening 62 is positioned at a higher position and more frontward than the upper end 52u of the bottom wall 52.

Accordingly, the battery case 34 becomes placed at the lower position as it proceeds (rearwardly) from the front portion outer edge of the loading vehicle body 12 toward the internal space 30 that is inside the loading vehicle body 12. In other words, the battery case 34 is placed in a forwardly inclined posture. Accordingly, an axial line of the insertion hole 50 along a direction in which the attachable and detachable battery 40 is inserted and removed is inclined at an angle θ from a vertically upper side toward the front. The angle θ is preferably 10° to 45°. In the case that the angle θ lies within such a range, attachment and detachment of the attachable and detachable battery 40 to and from the insertion hole 50 is easily performed.

Moreover, it should be noted that the upper end 62u of the opening 62 is at a higher position than the upper end 52u of the bottom wall 52, and further, the lower end 62d of the opening 62 is at a higher position than the lower end 52d of the bottom wall 52. However, concerning the lower end 62d of the opening 62 and the upper end 52u of the bottom wall 52, it is sufficient if one of them is at a lower position and the other of them is at a higher position. More specifically, as shown in FIG. 2, the upper end 52u of the bottom wall 52 can be placed at a lower position than the lower end 62d of the opening 62. Conversely, the lower end 62d of the opening 62 can also be placed at a lower position than the upper end 52u of the bottom wall 52.

In FIG. 2, an exemplary configuration is illustrated in which the opening 62 of the battery case 34 faces the front portion outer edge of the loading vehicle body 12. However, it is also possible for the opening 62 to face a left side portion outer edge, a right side portion outer edge, or a rear portion outer edge of the loading vehicle body 12.

The bottom wall 52 is orthogonal to the lower wall 54, the left side wall 56, the right side wall 58, and the upper wall 60. As will be discussed later, the bottom wall 52 is a wall portion that blocks and holds back the attachable and detachable battery 40 that is inserted into the insertion hole 50. A second connector 64 is provided on the bottom wall 52 at a position in close proximity to the upper wall 60. One end of a harness 66 is connected to the second connector 64. Another end of the harness 66 is passed through a non-illustrated insertion hole that is formed in the bottom wall 52, and thereafter, is electrically connected to a motor 70 inside the motor housing 36. Accordingly, by the second connector 64 engaging with the first connector 46, the attachable and detachable battery 40 and the motor 70 are electrically connected via the harness 66. Moreover, although illustration thereof is omitted, the harness 66 is connected to the motor 70 via an electrical current converter.

The battery case 34 further includes a lid member 72. The lid member 72 is provided on the case main body 48 so as to be capable of rotating. The lid member 72 serves to open and close the insertion hole 50 and the opening 62. The center of rotation of the lid member 72 is an upper portion edge of the upper wall 60.

As shown in FIG. 1, FIG. 2, and FIG. 4, the foremost end of the lid member 72 is the foremost end of the battery case 34. The foremost end of the lid member 72 is in closer proximity to the rear (inwardly of the loading vehicle body 12) than the foremost end of the front cover 22 (the front portion outer edge of the loading vehicle body 12). Further, the left end of the battery case 34 is positioned more to the right (further inwardly of the loading vehicle body 12) than the left side cover 24L. More specifically, the entirety of the battery case 34 is located more inward than the outer edge of the loading vehicle body 12. In other words, the entirety of the battery case 34 is accommodated in the interior of the loading vehicle body 12. Therefore, compared to a case in which a portion of the battery case 34 projects out from the outer edge of the loading vehicle body 12, the hand-guided type vibrating roller 10 can be made smaller in scale.

One portion of the battery case 34 (such as an upper end including the opening 62) is exposed from the internal space 30. The one portion that is exposed from the internal space 30 is also located more inward than the outer edge of the loading vehicle body 12. Accordingly, during traveling of the hand-guided type vibrating roller 10, the battery case 34 is prevented from coming into contact with any object. In this manner, by the entirety of the battery case 34 being accommodated in the interior of the loading vehicle body 12, the one portion of the battery case 34 that is exposed from the internal space 30 can be protected.

The motor housing 36 is adjacent to the battery case 34. The motor housing 36 extends, for example, in the vertical direction. The motor 70 is accommodated in the motor housing 36. The motor 70 has a stator including an electromagnetic coil, and a rotor including permanent magnets. Since the configuration thereof is well known, detailed illustration and explanation of the motor will be omitted. The second connector 64 is electrically connected via the harness 66 to the electromagnetic coil. From the fact that the battery case 34 is adjacent to the motor housing 36, the second connector 64 is in close proximity to the motor housing 36. Therefore, the harness 66 can be made shorter in length.

The motive power of the motor 70 is transmitted to the frontward roller 16 and the rearward roller 18 via a non-illustrated control circuit. More specifically, the frontward roller 16 and the rearward roller 18 are rotated by being driven based on the motive power of the motor 70. As a result, the hand-guided type vibrating roller 10 is made to travel.

A storage tank 74 is arranged rearward of the motor housing 36, the left side cover 24L, and the right side cover 24R. Water or oil (a liquid) is stored in the storage tank 74 through an injection port. The water or the oil is supplied to the road surface G in order to cool the road surface G as necessary, for example, at a time when the road surface G is at a high temperature or the like. In this manner, according to the first embodiment, the battery case 34, the motor housing 36, and the storage tank 74 are arranged in parallel in a straight line along the front-rear direction. The motor housing 36 is sandwiched between the battery case 34 and the storage tank 74. Moreover, it should be noted that the reference numeral 76 indicates a closing cap that closes the injection port of the storage tank 74.

As can be understood from FIG. 4, the entirety of the bottom wall 52 of the battery case 34 is positioned above and between a front end 16f of the frontward roller 16 and a rear end 16r of the frontward roller 16. More specifically, when the loading vehicle body 12 is viewed in plan, the bottom wall 52 overlaps the frontward roller 16. Moreover, it should be noted that the opening 62 of the battery case 34 may be positioned more frontward than the front end 16f of the frontward roller 16.

Further, a front end 36f of the motor housing 36 is positioned above and between the front end 16f and the rear end 16r of the frontward roller 16. On the other hand, a rear end 36r of the motor housing 36 is positioned above and between a front end 18f of the rearward roller 18 and a rear end 18r of the rearward roller 18 (for example, approximately midway between the front end 18f and the rear end 18r). In other words, when the loading vehicle body 12 is viewed in plan, the front end 36f of the motor housing 36 overlaps the frontward roller 16. Further, the rear end 36r of the motor housing 36 overlaps the rearward roller 18.

Furthermore, a front end 74*f* of the storage tank 74 is positioned more rearward than the front end 18*f* of the rearward roller 18. The front end 74*f* of the storage tank 74 is positioned more forward than the rear end 18*r* of the rearward roller 18. In other words, when the loading vehicle body 12 is viewed in plan, the front end 74*f* of the storage tank 74 overlaps the rearward roller 18.

Moreover, it should be noted that it is not necessarily essential that the storage tank 74 be loaded on the loading vehicle body 12. More specifically, the hand-guided type vibrating roller 10 may be constituted with the storage tank 74 omitted.

An operating handle 80 extending rearward is provided on a rear wall of the base frame 20. An electrical power switch 82 is provided on the operating handle 80. At a time when the worker WK has pressed in the electrical power switch 82, the motor 70 starts. Consequently, the hand-guided type vibrating roller 10 becomes capable of moving forward or moving rearward. Thereafter, along with the worker WK manually operating a traveling lever 86 provided in the vicinity of an operating rod 84, the hand-guided type vibrating roller 10 moves forward or moves rearward. Conversely, when the worker WK releases his/her hand from the traveling lever 86, the traveling lever 86 returns to its original position. As a result, the hand-guided type vibrating roller 10 stops.

Further, a rotation direction switching lever 88 is provided on the operating handle 80. The rotation direction switching lever 88 is a lever for switching the direction in which the motor 70 rotates. More specifically, at a time when the worker WK pushes the rotation direction switching lever 88 forward, the motor 70 rotates in a direction in which the hand-guided type vibrating roller 10 moves forward. Accordingly, in this state, when the worker WK pushes the traveling lever 86 with his/her hand, the hand-guided type vibrating roller 10 moves forward. Conversely, at a time when the worker WK pulls the rotation direction switching lever 88 rearward, the motor 70 rotates in a direction in which the hand-guided type vibrating roller 10 moves rearward. In this state, when the worker WK pulls in the traveling lever 86 with his/her hand or the like, the hand-guided type vibrating roller 10 moves rearward.

Furthermore, an ON/OFF lever 90 is provided on the operating handle 80. At a time when the worker WK has switched the ON/OFF lever 90 to the ON position, the vibration generating mechanism is driven. As a result, the frontward roller 16 and the rearward roller 18 vibrate. Conversely, at a time when the worker WK has switched the ON/OFF lever 90 to the OFF position, the vibration generating mechanism is stopped, and vibration of the frontward roller 16 and the rearward roller 18 is stopped.

The hand-guided type vibrating roller 10 (the non-riding type rolling compaction vehicle) according to the first embodiment is basically constructed in the manner described above. Next, a description will be given concerning the advantageous effects of the hand-guided type vibrating roller 10.

The hand-guided type vibrating roller 10 is used, for example, to level the road surface G at a time when pavement work on the road is performed. The worker WK pushes the rotation direction switching lever 88 forward and presses in the electrical power switch 82 to thereby start the motor 70. Further, the worker WK grasps the operating rod 84 with one hand, and places the other hand on the traveling lever 86. In this state, by the worker WK pushing the traveling lever 86 with his/her hand, the hand-guided type vibrating roller 10 moves forward. In order to cause the frontward roller 16 and the rearward roller 18 to vibrate, the worker WK sets the ON/OFF lever 90 in the ON position.

With respect to the road surface G, a rolling pressure is initially applied thereto by the frontward roller 16. Next, the road surface G is leveled by the rearward roller 18. In this instance, the frontward roller 16 that applies the rolling pressure initially to the road surface G is required to apply a large load to the road surface G.

In the hand-guided type vibrating roller 10, the entirety of the bottom wall 52 of the battery case 34 overlaps the frontward roller 16 as viewed in plan. Therefore, the weight of the battery case 34 and the weight of the attachable and detachable battery 40 that is accommodated in the battery case 34 are added to the frontward roller 16. Further, the front end 36*f* of the motor housing 36 also overlaps the frontward roller 16. Accordingly, a portion of the weight of the motor housing 36, and a portion of the weight of the motor 70 are added to the frontward roller 16. For the reasons mentioned above, the weight of the battery case 34, the attachable and detachable battery 40, the motor housing 36, and the motor 70 is applied to the road surface G via the frontward roller 16.

In this manner, according to the first embodiment, a large load can be applied to the road surface G from the frontward roller 16. Accordingly, the frontward roller 16 can easily apply the rolling pressure to the road surface G.

Further, in a plan view of the hand-guided type vibrating roller 10, the rear end 36*r* of the motor housing 36, and the front end 74*f* of the storage tank 74 overlap the rearward roller 18. Accordingly, a portion of the weight of the motor housing 36, a portion of the weight of the motor 70, a portion of the weight of the storage tank 74, and a portion of the weight of the water or the oil in the storage tank 74 are added cumulatively to the rearward roller 18. For the aforementioned reason, the weight of the motor housing 36, the motor 70, the storage tank 74, and the water or the oil is applied to the road surface G via the rearward roller 18.

In this manner, according to the first embodiment, it is also possible to apply a large load to the road surface G from the rearward roller 18. Accordingly, the road surface G can be smoothly leveled by the rearward roller 18.

While the hand-guided type vibrating roller 10 is traveling, if the road surface G is at a high temperature, the water or the oil that is stored in the storage tank 74 is supplied to the road surface G by an operation of the worker WK. By the water or the oil, the road surface G is cooled. At this time, accompanying a decrease in the amount of the water or the oil in the storage tank 74, the weight that acts on the rearward roller 18 decreases. In this instance, the road surface G, which has been leveled by the frontward roller 16, is subjected to leveling again by the rearward roller 18. Accordingly, the load required for the rearward roller 18 is smaller than the load required for the frontward roller 16. Therefore, even if the weight acting on the rearward roller 18 is reduced, insufficient leveling of the road surface G can be avoided.

On the other hand, the weight of the battery case 34, the attachable and detachable battery 40, the motor housing 36, and the motor 70 does not decrease irrespective of the degree of operation of the hand-guided type vibrating roller 10. Accordingly, the load acting on the frontward roller 16 also does not decrease. Therefore, an insufficient leveling of the road surface G by the frontward roller 16 along with the operation of the hand-guided type vibrating roller 10 can also be avoided.

Incidentally, it is assumed that after the worker WK has stored the water or the oil in the storage tank 74, the worker WK may forget to attach the closing cap 76 to the injection port. Further, in a situation in which the road surface G is required to be frequently cooled, the storage tank 74 is frequently replenished with the water or the oil. At this time, attachment of the closing cap 76 to the injection port may not be carried out. If the frontward roller 16 and the rearward roller 18 are vibrated in this state, there is a concern that a portion of the water or the oil may splash out from the injection port.

In this instance, according to the first embodiment, the motor housing 36 is positioned between the storage tank 74 and the battery case 34. Therefore, the separation distance between the storage tank 74 and the battery case 34 is large. In addition, the water or the oil that has splashed out from the injection port is blocked by the motor housing 36. Consequently, it becomes difficult for the water or the oil to reach the battery case 34. Additionally, since the battery case 34 is placed in a forwardly inclined posture, the opening 62 is inclined in a direction away from the storage tank 74. Accordingly, even if the water or the oil reaches the battery case 34, it is difficult for the water or the oil to enter the insertion hole 50.

In order to facilitate the attachment and detachment of the attachable and detachable battery 40 to and from the battery case 34, a portion of the battery case 34 (such as the upper end including the opening 62) may be exposed from the internal space 30. In such a configuration as well, for the reasons mentioned above, the battery case 34 and the attachable and detachable battery 40, for example, are prevented from being exposed to water. Consequently, any concern that electrical leakage or short circuiting may occur through contact with water can be dispensed with.

Moreover, it should be noted that it is not necessary to make the motor 70 attachable to and detachable from the motor housing 36. More specifically, there is no particular need to provide the motor housing 36 with a lid or the like that is capable of being opened and closed. Accordingly, the motor housing 36 can be made into a structure that exhibits superior airtightness or liquid-tightness. Therefore, even if the motor housing 36 is exposed to water, the motor 70 is sufficiently prevented from being exposed to water.

Further, in the case that the stored substance is oil, the motor 70, the battery case 34, and the attachable and detachable battery 40 are prevented from becoming contaminated by the oil.

In order to switch the traveling direction of the hand-guided type vibrating roller 10 from a frontward direction to a rearward direction, the worker WK first releases his/her hand from the traveling lever 86. In accordance therewith, the traveling lever 86 is returned to its original position. As a result, the hand-guided type vibrating roller 10 stops. In this state, the worker WK pulls the rotation direction switching lever 88 rearward. Next, by the worker WK pulling in the traveling lever 86 with his/her hand, the motor 70 begins to rotate in a direction opposite to the direction of rotation of the hand-guided type vibrating roller 10 when it moves forward. As a result, the hand-guided type vibrating roller 10 moves rearward. During this time, the vibration of the frontward roller 16 and the rearward roller 18 may be stopped. If necessary, the vibration of the frontward roller 16 and the rearward roller 18 may be continued.

In this manner, in the hand-guided type vibrating roller 10, the motor 70 serves as a drive source for enabling the frontward roller 16 and the rearward roller 18 to travel. In the hand-guided type vibrating roller 10, the traveling direction of the hand-guided type vibrating roller 10 can be changed merely by switching the direction of rotation of the motor 70. Accordingly, there is no particular need to further mount a transmission or the like on the loading vehicle body 12. Therefore, the weight of the hand-guided type vibrating roller 10 can be reduced. Further, since there is no need to further mount a transmission or the like, the degree of freedom in the arrangement positions of the devices (the vibration generating mechanism, the battery case 34, the motor housing 36, and the like) that are mounted on the loading vehicle body 12 is improved.

At a time when the SOC of the attachable and detachable battery 40 has decreased, the attachable and detachable battery 40 is replaced by the worker WK with a newly charged attachable and detachable battery 40. Replacement of the battery is performed, for example, after the new attachable and detachable battery 40 has been transported to the hand-guided type vibrating roller 10. Alternatively, replacement of the attachable and detachable battery 40 may be performed after the worker WK has driven the hand-guided type vibrating roller 10 to a location where the new attachable and detachable battery 40 has been set down.

When replacement of the battery is performed, as shown in FIG. 2, the worker WK goes around to the front of the battery case 34 and grasps the lower end of the lid member 72. Next, the worker WK rotates the lid member 72 about the upper portion edge of the upper wall 60 in a manner so that the lower end of the lid member 72 pivots upward. In accordance with this feature, a state is brought about in which the opening 62 and the insertion hole 50 become capable of being visually confirmed. Next, the worker WK grasps the handle portion 42 of the attachable and detachable battery 40 inside the insertion hole 50, and pulls up the attachable and detachable battery 40 toward a higher position in the forward direction.

The lower wall 54 that forms the insertion hole 50 is inclined. Therefore, the lower wall 54 bears a portion of the weight of the attachable and detachable battery 40. Accordingly, at a time when the worker WK pulls up the attachable and detachable battery 40 from the insertion hole 50, the lower wall 54 bears the load of the attachable and detachable battery 40. Therefore, the force required when the worker WK pulls up the attachable and detachable battery 40 from the insertion hole 50 can be made smaller than in a case in which the insertion hole 50 extends in the vertical direction.

Further, the opening 62 of the battery case 34 faces the front of the loading vehicle body 12. Accordingly, the attachable and detachable battery 40, which moves accompanying the removal thereof, does not interfere with the motor housing 36 and the storage tank 74 that are arranged rearward of the battery case 34. Therefore, the attachable and detachable battery 40 can be easily separated from the battery case 34.

Furthermore, the battery case 34 is inclined in a manner so that the opening 62 faces an outer edge (typically, the front portion outer edge) of the loading vehicle body 12. In this case, compared to a case in which the battery case 34 is not inclined (for example, a case in which the opening 62 faces vertically upward), the opening 62 becomes placed at a lower position, and further, the distance between the opening 62 and the worker WK becomes smaller. Accordingly, at a time when the worker WK who is standing outside the loading vehicle body 12 pulls out the attachable and detachable battery 40 from the insertion hole 50 of the battery case 34, the moving distance of the attachable and detachable battery 40 from the insertion hole 50 until reaching the ground surface becomes smaller. Therefore, the attachable and detachable battery 40 can be easily separated from the battery case 34.

Next, the worker WK accommodates the new attachable and detachable battery 40 in the insertion hole 50 of the battery case 34. For this purpose, the worker WK grasps the handle portion 42 of the new attachable and detachable battery 40 and lifts up the attachable and detachable battery 40. Furthermore, the worker WK places the attachable and detachable battery 40 in an inclined posture, in a manner so that the bottom surface 44 is at a slightly lower position, and the handle portion 42 is at a slightly higher position.

Thereafter, the worker WK brings one side surface of the attachable and detachable battery 40 into contact with the lower wall 54 that forms the insertion hole 50. Furthermore, from this state, the attachable and detachable battery 40 is made to slide along the lower wall 54 toward the bottom wall 52. Consequently, the bottom surface 44 of the attachable and detachable battery 40 comes into contact with the bottom wall 52 of the insertion hole 50. As a result, the attachable and detachable battery 40 is supported by the battery case 34. Further, the first connector 46 provided on the bottom surface 44 of the attachable and detachable battery 40 and the second connector 64 provided on the bottom wall 52 of the battery case 34 engage with each other.

The lower wall 54 is inclined with respect to the vertical direction and the horizontal direction in a manner so as to become lower toward the bottom wall 52. Therefore, the attachable and detachable battery 40 easily slides on the lower wall 54 due to its own weight. Accordingly, the force required when the worker WK pushes the attachable and detachable battery 40 into the insertion hole 50 can be made smaller than in a case in which the insertion hole 50 extends in the horizontal direction. In this manner, by the lower wall 54 being inclined with respect to the horizontal direction and the vertical direction, also at a time when the battery case 34 is accommodated in the attachable and detachable battery 40, the attachable and detachable battery 40 can easily be made to slide along the lower wall 54.

Furthermore, the battery case 34 is inclined in a manner so that the opening 62 faces an outer edge (typically, the front portion outer edge) of the loading vehicle body 12. In this case, compared to a case in which the battery case 34 is not inclined (for example, a case in which the opening 62 faces vertically upward), the opening 62 becomes placed at a lower position, and further, the distance between the opening 62 and the worker WK becomes smaller. Accordingly, at a time when the worker WK who is standing outside the loading vehicle body 12 pushes the attachable and detachable battery 40 into the insertion hole 50 of the battery case 34, the moving distance of the attachable and detachable battery 40 from the ground surface to the insertion hole 50 becomes smaller. Therefore, the attachable and detachable battery 40 can be easily installed in the battery case 34.

After the replacement of the attachable and detachable battery 40 has been completed in the manner described above, the worker WK grasps the lower end of the lid member 72, which has become placed at a higher position, and rotates the lid member 72 by approximately 180°. Consequently, the attachable and detachable battery 40 that is accommodated in the insertion hole 50 is shielded. From then on, the worker WK may perform rolling compaction and leveling in the same manner as described previously.

Next, a second embodiment of the present invention will be described using, as an example, a tandem type road roller. Such a tandem type road roller is one type of a riding type rolling compaction vehicle.

Moreover, it should be noted that the same reference numerals are applied to constituent elements that are the same as or correspond to the constituent elements in the first embodiment, and there is no particular need for such elements to be distinguished from the constituent elements of the first embodiment. Further, the worker WK is not shown in FIG. 5 to FIG. 7.

Figure 5:
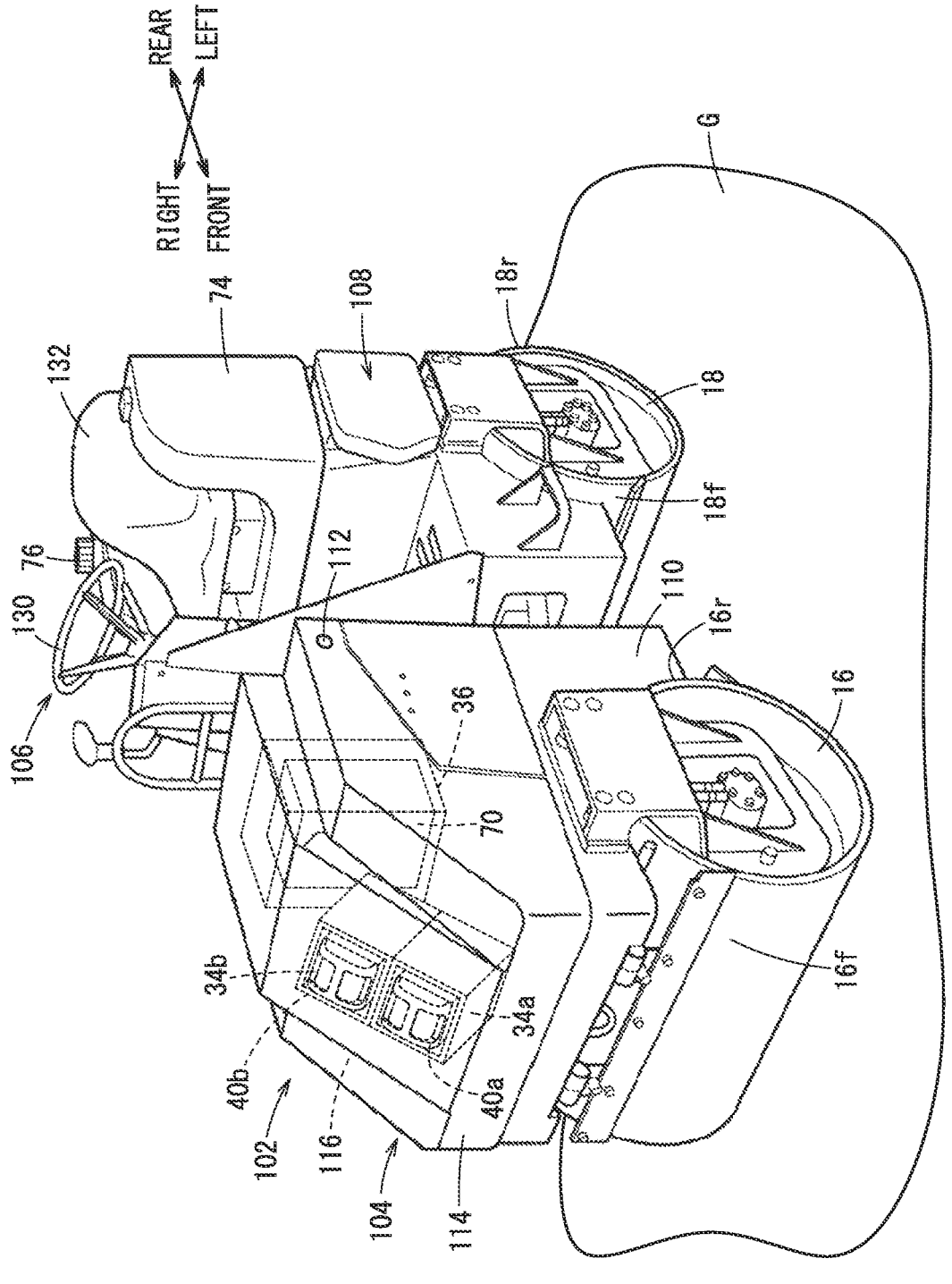
FIG. 5 is an overall schematic perspective view of a riding type rolling compaction vehicle (a tandem type road roller) according to a second embodiment of the present invention.

As shown in FIG. 5, a riding vehicle body 102 of a tandem type road roller 100 includes a loading section 104 that constitutes the front portion of the riding vehicle body 102, an operation unit 106 that constitutes a substantially central portion of the riding vehicle body 102, and a riding section 108 that constitutes the rear portion of the riding vehicle body 102.

The frontward roller 16 serving as a frontward rolling compaction wheel is provided at the front lower portion of the loading section 104 so as to be capable of rotating and capable of vibrating. Further, the rearward roller 18 serving as a rearward rolling compaction wheel is provided at the rear lower portion of the riding section 108 so as to be capable of rotating and capable of vibrating. At a time when the frontward roller 16 and the rearward roller 18 rotate from the rear toward the front in a state of being in contact with the road surface G, the tandem type road roller 100 moves forward. On the other hand, at a time when the frontward roller 16 and the rearward roller 18 rotate from the front toward the rear in a state of being in contact with the road surface G, the tandem type road roller 100 moves rearward. The frontward roller 16 and the rearward roller 18 are so-called iron wheels made of an iron-based material.

Figure 6:
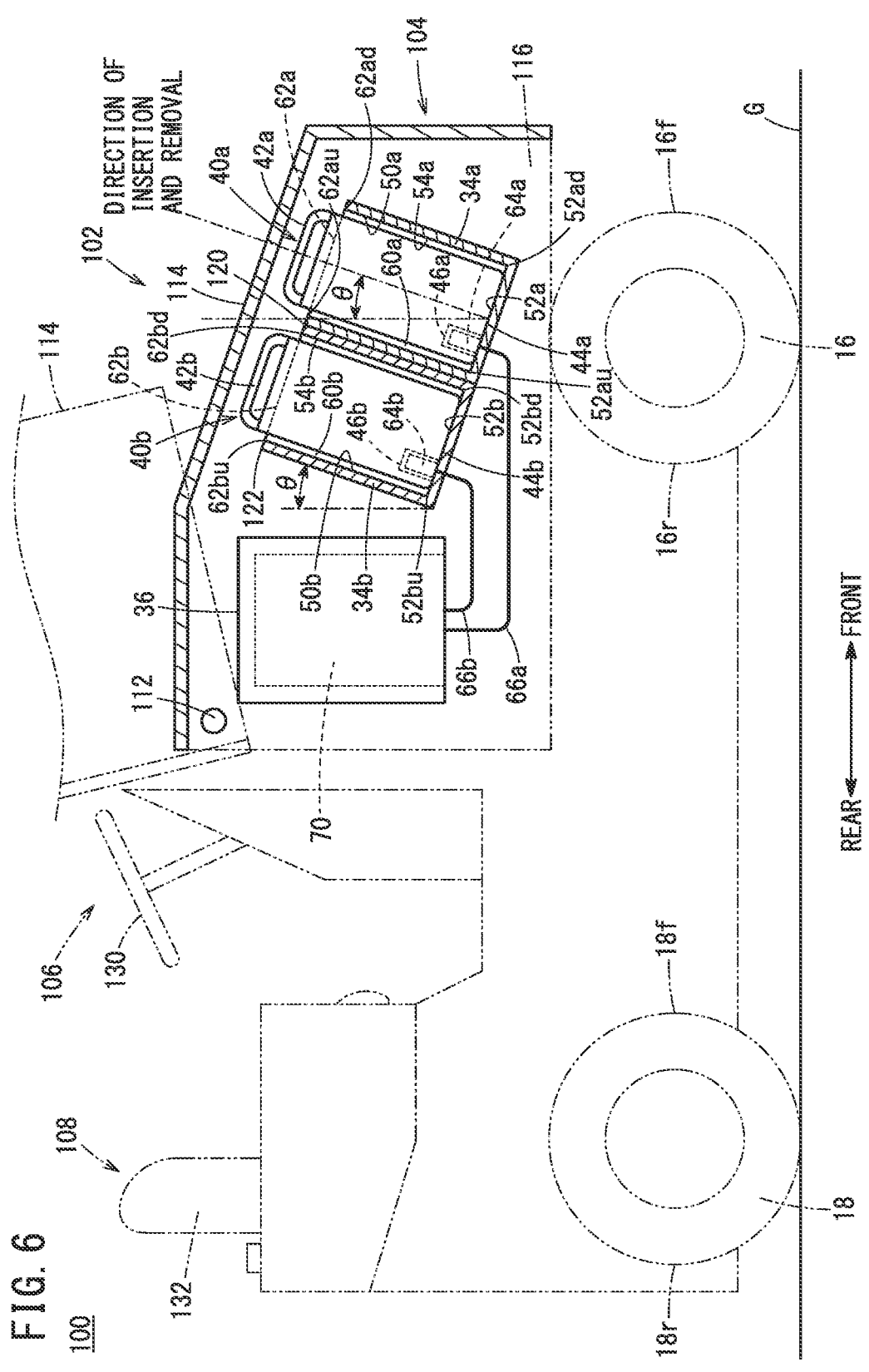
FIG. 6 is a schematic right side cross-sectional view of the tandem type road roller.

Further, the loading section 104 includes a base panel 110 attached to a non-illustrated front frame, and a bonnet 114 connected to the base panel 110 via a hinge 112 shown in FIG. 6. The base panel 110 and the bonnet 114 form an inner chamber 116. The hinge 112 is provided at a rear end of the base panel 110. Therefore, the bonnet 114 rotates about the hinge 112 in a manner so that the front end thereof rises toward the rear.

The inner chamber 116 is shielded at a time when the bonnet 114 is in a closed state, and is exposed at a time when the bonnet 114 is in an open state as shown by the phantom line in FIG. 6. In this manner, the bonnet 114 serves as a cover member for opening and closing the inner chamber 116. Moreover, it should be noted that, as shown in FIG. 5 and FIG. 6, the bonnet 114 in the closed state becomes placed at a higher position from the front toward the rear. More specifically, the bonnet 114 is inclined in a manner so that the front thereof is at a lower (downward) position and the rear thereof is at a higher (upward) position.

As shown in FIG. 5 to FIG. 7, a first battery case 34a, a second battery case 34b, and the motor housing 36 are accommodated in the inner chamber 116. More specifically, in the second embodiment, two battery cases are provided in the riding vehicle body 102. A first attachable and detachable battery 40a and a second attachable and detachable battery 40b are accommodated, respectively, in the first battery case 34a and the second battery case 34b. Moreover, it should be noted that each of the first battery case 34a and the second battery case 34b are of the same configuration as that of the case main body 48 of the battery case 34 in the first embodiment. Further, each of the first attachable and detachable battery 40a and the second attachable and detachable battery 40b are of the same configuration as that of the attachable and detachable battery 40 in the first embodiment.

However, according to the second embodiment, in order to easily distinguish between the first battery case 34a and the second battery case 34b, the names of the constituent elements of the case main body 48 shown in the first embodiment with the term "first" added to the beginning thereof are used as the names of the constituent elements of the first battery case 34*a* (however, the "second connector" is excluded). Further, the names of the constituent elements of the case main body 48 shown in the first embodiment with the term "second" added to the beginning thereof are used as the names of the constituent elements of the second battery case 34*b* (however, the "second connector" is excluded). Furthermore, the reference numerals obtained by adding "a" or "b" to the reference numerals of the constituent elements of the case main body 48 shown in the first embodiment are used as the reference numerals of the constituent elements of the first battery case 34*a* or the second battery case 34*b*.

Similarly, according to the second embodiment, in order to easily distinguish between the first attachable and detachable battery 40*a* and the second attachable and detachable battery 40*b*, the names of the constituent elements of the attachable and detachable battery 40 shown in the first embodiment with the term "first" added to the beginning thereof are used as the names of the constituent elements of the first attachable and detachable battery 40*a* (however, the "first connector" is excluded). Further, the names of the constituent elements of the attachable and detachable battery 40 shown in the first embodiment with the term "second" added to the beginning thereof are used as the names of the constituent elements of the second attachable and detachable battery 40*b* (however, the "first connector" is excluded). Furthermore, the reference numerals obtained by adding "a" or "b" to the reference numerals of the constituent elements of the attachable and detachable battery 40 shown in the first embodiment are used as the reference numerals of the constituent elements of the first attachable and detachable battery 40*a* or the second attachable and detachable battery 40*b*.

The loading section 104 is positioned at a higher position than the frontward roller 16, and therefore the first battery case 34*a*, the second battery case 34*b*, and the motor housing 36 provided in the inner chamber 116 are also positioned at a higher position than the frontward roller 16. The first battery case 34*a* is disposed at a front portion of the inner chamber 116, and the second battery case 34*b* is disposed at a rear portion of the inner chamber 116. More specifically, in the inner chamber 116, the first battery case 34*a* and the second battery case 34*b* are arranged in parallel and adjacent to each other along the front-rear direction of the loading section 104. Alternatively, the first battery case 34*a* and the second battery case 34*b* may be integrally provided as one battery holder.

Therefore, as can be particularly understood from FIG. 6, in the second embodiment, the first battery case 34*a* is in an inclined posture. In addition, a lower end 62*ad* of a first opening 62*a* is positioned at a higher position and more forward than a lower end 52*ad* of a first bottom wall 52*a*. An upper end 62*au* of the first opening 62*a* is positioned at a higher position and more forward than an upper end 52*au* of the first bottom wall 52*a*. Further, the first opening 62*a* faces a front portion outer edge of the riding vehicle body 102. On the other hand, the first bottom wall 52*a* faces the inner chamber 116 (inwardly of the riding vehicle body 102).

For this reason, the first battery case 34*a* is in a forwardly inclined posture that becomes lower as it proceeds (rearwardly) from the front portion outer edge of the riding vehicle body 102 toward the inner chamber 116 that is in the interior of the riding vehicle body 102. Accordingly, an axial line of a first insertion hole 50*a* along a direction in which the first attachable and detachable battery 40*a* is inserted and removed is inclined at an angle θ from a vertically upper side toward the front. The angle θ is preferably 10° to 45°. In the case that the angle θ is set within such a range, attachment and detachment of the first attachable and detachable battery 40*a* to and from the first insertion hole 50*a* is easily performed.

Moreover, it should be noted that the upper end 62*au* of the first opening 62*a* is at a higher position than the upper end 52*au* of the first bottom wall 52*a*, and the lower end 62*ad* of the first opening 62*a* is at a higher position than the lower end 52*ad* of the first bottom wall 52*a*. However, the lower end 62*ad* of the first opening 62*a* may be at a lower position than the upper end 52*au* of the first bottom wall 52*a*. Conversely, the upper end 52*au* of the first bottom wall 52*a* may be at a lower position than the lower end 62*ad* of the first opening 62*a*.

As will be discussed later, the first bottom wall 52*a* is a wall portion that blocks and holds back the first attachable and detachable battery 40*a* that is inserted into the first insertion hole 50*a*. A second connector 64*a* is provided on the first bottom wall 52*a*. The second connector 64*a* is in close proximity to a first upper wall 60*a*. One end of a first harness 66*a* is connected to the second connector 64*a*. Another end of the first harness 66*a* is passed through a non-illustrated insertion hole that is formed in the first bottom wall 52*a*, and is connected to the motor 70 inside the motor housing 36.

The second battery case 34*b* is also placed in a forwardly inclined posture. Therefore, a lower end 62*bd* (a front end of a second lower wall 54*b*) of a second opening 62*b* is positioned at a higher position and more frontward than a lower end 52*bd* (a rear end of the second lower wall 54*b*) of a second bottom wall 52*b*. An upper end 62*bu* (a rear end of a second upper wall 60*b*) of the second opening 62*b* is positioned at a higher position and more frontward than an upper end 52*bu* (a rear end of the second bottom wall 52*b*) of the second bottom wall 52*b*. As shown in FIG. 7, the second lower wall 54*b* and the second upper wall 60*b* are connected via the second bottom wall 52*b*, a second left side wall 56*b*, and a second right side wall 58*b*.

The second bottom wall 52*b* is a wall portion that blocks and holds back the second attachable and detachable battery 40*b* that is inserted into a second insertion hole 50*b*. A second connector 64*b* is provided on the second bottom wall 52*b*. One end of a second harness 66*b* is connected to the second connector 64*b*. Another end of the second harness 66*b* is passed through a non-illustrated insertion hole that is formed in the second bottom wall 52*b*, and is connected to the motor 70 inside the motor housing 36.

Reference numerals 120 and 122 in FIG. 6 indicate, respectively, a first upper end which is at a highest position of the first battery case 34*a*, and a second upper end which is at a highest position of the second battery case 34*b*. As noted previously, both the first battery case 34*a* which is positioned at the front portion of the inner chamber 116, and the second battery case 34*b* which is positioned at the rear portion of the inner chamber 116, are placed in a forwardly inclined posture. Accordingly, the first upper end 120 is at a lower position than the second upper end 122. More specifically, a height difference is formed between the first upper end 120 and the second upper end 122.

The bonnet 114 is inclined in accordance with the aforementioned height difference. More specifically, a front portion of the bonnet 114 is at a lower position, and a rear portion of the bonnet 114 is at a higher position. Moreover, it should be noted that, at a time when the bonnet 114 is in an open state (when the inner chamber 116 is exposed), the first battery case 34*a* and the second battery case 34*b* are exposed. More specifically, the worker WK is capable of visually confirming the first battery case 34*a* and the second battery case 34b. Further, at a time when the bonnet 114 is in a closed state (when the inner chamber 116 is shielded), the first battery case 34a and the second battery case 34b are shielded by the bonnet 114. In the closed state, the worker WK is incapable of visually confirming the first battery case 34a and the second battery case 34b.

FIG. 7 is a schematic plan view of the loading section 104. As shown in FIG. 7, at a time when the riding vehicle body 102 is viewed in plan, substantially the entirety of the first bottom wall 52a of the first battery case 34a, and a major portion of the second bottom wall 52b of the second battery case 34b overlap the frontward roller 16. Moreover, it should be noted that at least a portion of either one of the first bottom wall 52a or the second bottom wall 52b need not necessarily overlap the frontward roller 16 as viewed in plan.

According to the second embodiment, the first battery case 34a, the second battery case 34b, and the motor housing 36 are arranged in parallel in this order from the front portion to the rear portion of the inner chamber 116. The motor housing 36 extends, for example, in the vertical direction. At a time when the bonnet 114 is in a closed state, the bonnet 114 covers the motor housing 36. More specifically, the first battery case 34a, the second battery case 34b, and the motor housing 36 are all accommodated within the inner chamber 116. In other words, among the first battery case 34a, the second battery case 34b, and the motor housing 36, no portions thereof exist that extend outwardly from the outer edge of the riding vehicle body 102. Accordingly, in the same manner as in the first embodiment, the tandem type road roller 100 can be made smaller in scale.

Further, in the second embodiment, the second connector 64a is electrically connected to the electromagnetic coil of the motor 70 via the first harness 66a. Similarly, the second connector 64b is also electrically connected to the electromagnetic coil of the motor 70 via the second harness 66b. Since the motor housing 36 is in close proximity to the first battery case 34a and the second battery case 34b within the inner chamber 116, the first harness 66a and the second harness 66b can be made shorter in length.

A vibration generating mechanism for the purpose of vibrating the frontward roller 16 and the rearward roller 18 is further accommodated in the inner chamber 116. Since such a vibration generating mechanism in a riding type rolling compaction vehicle is also well known, detailed explanation and illustration of this feature will be omitted.

A steering handle 130 projects out from the rear end of the loading section 104 toward the operation unit 106. By the steering handle 130 being rotated by the worker WK, the traveling direction of the tandem type road roller 100 is changed. An electrical power switch for turning the motor 70 on and off, a vibration ON/OFF switch for turning the vibration generating mechanism on and off, and various levers or the like are provided on the operation unit 106; however, illustration of these elements is omitted.

A driver's seat 132 on which the worker WK is seated is provided in the riding section 108. Further, the storage tank 74 is provided in a manner so as to surround the driver's seat 132. Water or oil is stored in the storage tank 74 in the same manner as in the first embodiment. Accordingly, the weight of the worker WK who is seated on the driver's seat 132, the weight of the storage tank 74, and the weight of the water or the oil that is stored in the storage tank 74 are applied to the rearward roller 18.

The tandem type road roller 100 (the riding type rolling compaction vehicle) according to the second embodiment is basically constructed in the manner described above. Next, a description will be given concerning the advantageous effects of the tandem type road roller 100.

The tandem type road roller 100, in the same manner as the hand-guided type vibrating roller 10, is used when leveling the road surface G of a road where pavement work has been performed. The bonnet 114 is inclined in a manner so that the front portion thereof is at a lower position and the rear portion thereof is at a higher position, and therefore at a time when the tandem type road roller 100 moves forward on the road surface G, the resistance of traveling wind from the front of the bonnet 114 is reduced. Further, when an obstacle or the like comes into contact with the bonnet 114, any adverse influence thereof can be reduced.

At a time when the tandem type road roller 100 travels on the road surface G, the frontward roller 16 and the rearward roller 18 are vibrated by the vibration generating mechanism. Due to such vibration, a rolling pressure is initially applied to the road surface G by the frontward roller 16. Accordingly, the frontward roller 16 that applies the rolling pressure initially to the road surface G is required to apply a large load to the road surface G.

In the tandem type road roller 100, substantially the entirety of the first bottom wall 52a of the first battery case 34a, and a major portion of the second bottom wall 52b of the second battery case 34b overlap the frontward roller 16. Accordingly, the weight of the first battery case 34a, the second battery case 34b, the first attachable and detachable battery 40a, and the second attachable and detachable battery 40b is applied to the road surface G via the frontward roller 16. Therefore, in the second embodiment as well, a large load can be applied to the road surface G from the frontward roller 16. Consequently, the frontward roller 16 can easily apply the rolling pressure to the road surface G.

Further, the weight of the worker WK, the weight of the storage tank 74, and the weight of the water or the oil inside the storage tank 74 act on the rearward roller 18. Accordingly, the weight of the worker WK, the weight of the storage tank 74, and the weight of the water or the oil are applied to the road surface G via the rearward roller 18. Consequently, the road surface G can be smoothly leveled by the rearward roller 18.

At a time when the road surface G is at a high temperature while the tandem type road roller 100 is traveling, the water or the oil that is stored in the storage tank 74 is supplied to the road surface G by an operation of the worker WK. By the water or the oil, the road surface G is cooled.

In the tandem type road roller 100, the first battery case 34a and the second battery case 34b are disposed in the loading section 104, which is the front portion of the riding vehicle body 102, and the storage tank 74 is disposed in the riding section 108, which is the rear portion of the riding vehicle body 102. Therefore, the separation distance between the storage tank 74, and the first battery case 34a and the second battery case 34b is large. In addition, the first battery case 34a and the second battery case 34b are shielded by the bonnet 114.

Accordingly, even in the case that the worker WK forgets to attach the closing cap 76 to the injection port, and a portion of the water or the oil splashes out from the injection port, a situation can be avoided in which the first attachable and detachable battery 40a and the second attachable and detachable battery 40b become wet by the water or the oil. The same also applies to the case that attachment of the closing cap 76 to the injection port is not carried out. Such a situation may occur, for example, in the case that the road surface G needs to be frequently cooled, and the storage tank 74 is frequently replenished with the water or the oil.

In order to change the traveling direction of the tandem type road roller 100, the worker WK rotates the steering handle 130. Moreover, in the case that the tandem type road roller 100 is made to travel in a rearward direction, the worker WK operates a rotation direction switching lever provided on the operation unit 106. In accordance with this feature, the direction of rotation of the motor 70 is switched to an opposite direction. In this manner, in the second embodiment as well, by switching the direction of rotation of the motor 70, the traveling direction of the tandem type road roller 100 can be switched from a frontward direction to a rearward direction, or vice versa.

At a time when the SOC of the first attachable and detachable battery 40*a* and the second attachable and detachable battery 40*b* has decreased, the first attachable and detachable battery 40*a* and the second attachable and detachable battery 40*b* are replaced by the worker WK with a newly charged first attachable and detachable battery 40*a* and a newly charged second attachable and detachable battery 40*b*.

When replacement of the battery is performed, the worker WK goes around to the front of the loading section 104, and grasps the front end of the bonnet 114. Next, the worker WK rotates the bonnet 114 about the rear end of the bonnet 114, in a manner so that the front end of the bonnet 114 pivots upward. In accordance with this feature, a state is brought about in which the worker WK becomes capable of visually confirming the first battery case 34*a* and the second battery case 34*b*.

Next, the worker WK grasps a first handle portion 42*a* of the first attachable and detachable battery 40*a* inside the first insertion hole 50*a*, and pulls up the first attachable and detachable battery 40*a* toward a higher position in the forward direction. From the fact that a first lower wall 54*a* that forms the first insertion hole 50*a* is inclined, the first lower wall 54*a* bears a portion of the weight of the first attachable and detachable battery 40*a*. Accordingly, at a time when the worker WK pulls up the first attachable and detachable battery 40*a* from the first insertion hole 50*a*, the first lower wall 54*a* bears the load of the first attachable and detachable battery 40*a*. Therefore, the force required when the worker WK pulls up the first attachable and detachable battery 40*a* from the first insertion hole 50*a* can be made smaller than in a case in which the first insertion hole 50*a* extends in the vertical direction.

Furthermore, the first battery case 34*a* is inclined in a manner so that the first opening 62*a* faces an outer edge (typically, the front portion outer edge) of the riding vehicle body 102. In this case, compared to a case in which the first battery case 34*a* is not inclined (for example, a case in which the first opening 62*a* faces vertically upward), the first opening 62*a* becomes placed at a lower position, and further, the distance between the first opening 62*a* and the worker WK becomes smaller. Accordingly, at a time when the worker WK who is standing outside of the riding vehicle body 102 pulls out the first attachable and detachable battery 40*a* from the first insertion hole 50*a* of the first battery case 34*a*, the moving distance of the first attachable and detachable battery 40*a* from the first insertion hole 50*a* until reaching the ground surface becomes smaller. Therefore, the first attachable and detachable battery 40*a* can be easily separated from the first battery case 34*a*.

Next, the worker WK accommodates the new first attachable and detachable battery 40*a* into the first insertion hole 50*a* of the first battery case 34*a*. For this purpose, the worker WK grasps the first handle portion 42*a* of the new first attachable and detachable battery 40*a* and lifts up the first attachable and detachable battery 40*a*. Furthermore, the worker WK places the first attachable and detachable battery 40*a* in an inclined posture, in a manner so that a first bottom surface 44*a* is at a slightly lower position, and the first handle portion 42*a* is at a slightly higher position.

The worker WK brings one side surface of the first attachable and detachable battery 40*a* into contact with the first lower wall 54*a* that forms the first insertion hole 50*a*. Furthermore, from this state, the worker WK causes the first attachable and detachable battery 40*a* to slide along the first lower wall 54*a* toward the first bottom wall 52*a*. As a result, the first bottom surface 44*a* of the first attachable and detachable battery 40*a* comes into contact with the first bottom wall 52*a* of the first insertion hole 50*a*. Along therewith, the first attachable and detachable battery 40*a* is supported by the first battery case 34*a*. Further, a first connector 46*a* provided on the first bottom surface 44*a* of the first attachable and detachable battery 40*a*, and the second connector 64*a* provided on the first bottom wall 52*a* of the first battery case 34*a* engage with each other.

The first lower wall 54*a* is inclined with respect to the vertical direction and the horizontal direction in a manner so as to become lower toward the first bottom wall 52*a*. Therefore, the first attachable and detachable battery 40*a* easily slides on the first lower wall 54*a* due to its own weight. Accordingly, the force required when the worker WK pushes the first attachable and detachable battery 40*a* into the first insertion hole 50*a* can be made smaller than in a case in which the first insertion hole 50*a* extends in the horizontal direction. In this manner, by the first lower wall 54*a* being inclined, also at a time when the first attachable and detachable battery 40*a* is accommodated in the first battery case 34*a*, the first attachable and detachable battery 40*a* can easily be made to slide along the first lower wall 54*a*.

Furthermore, the first battery case 34*a* is inclined in a manner so that the first opening 62*a* faces an outer edge (typically, the front portion outer edge) of the riding vehicle body 102. In this case, compared to a case in which the first battery case 34*a* is not inclined (for example, a case in which the first opening 62*a* faces vertically upward), the first opening 62*a* becomes placed at a lower position, and further, the distance between the first opening 62*a* and the worker WK becomes smaller. Accordingly, at a time when the worker WK who is standing outside of the riding vehicle body 102 pushes the first attachable and detachable battery 40*a* into the first insertion hole 50*a* of the first battery case 34*a*, the moving distance of the first attachable and detachable battery 40*a* from the ground surface to the first insertion hole 50*a* becomes smaller. Therefore, the first attachable and detachable battery 40*a* can be easily installed in the first battery case 34*a*.

Concerning the features noted above, the same features also apply at the time when the second attachable and detachable battery 40*b* is replaced.

After the first attachable and detachable battery 40*a* and the second attachable and detachable battery 40*b* have been replaced in the manner described above, the worker WK grasps the front end of the bonnet 114, which has become placed at a higher position, and rotates the bonnet 114 by approximately 90°. Consequently, the first attachable and detachable battery 40*a* that is accommodated in the first insertion hole 50*a*, and the second attachable and detachable battery 40*b* that is accommodated in the second insertion hole 50*b* are shielded by the bonnet 114. From then on, in the same manner as described above, the worker WK performs the rolling compaction and leveling operation.

In this manner, in the riding type rolling compaction vehicle according to the second embodiment as well, the same advantages and effects can be obtained as those of the non-riding type rolling compaction vehicle according to the first embodiment.

As has been described above, the present invention is characterized by the rolling compaction vehicle (10) equipped with the vehicle body (12), and the frontward rolling compaction wheel (16) and the rearward rolling compaction wheel (18) that are provided on the lower portion of the vehicle body, the rolling compaction vehicle including: the battery case (34) that is provided in the vehicle body at a higher position than the frontward rolling compaction wheel and the rearward rolling compaction wheel, and that attachably and detachably accommodates the attachable and detachable battery (40); and the motor (70) that is provided in the vehicle body and that drives the frontward rolling compaction wheel and the rearward rolling compaction wheel with electrical power supplied from the attachable and detachable battery, wherein the insertion hole (50) that is capable of accommodating the attachable and detachable battery is formed in the battery case, the opening (62) through which the attachable and detachable battery is inserted into the insertion hole or removed from the insertion hole is formed at the first end of the insertion hole, and the second end of the insertion hole is the wall portion (52) that blocks and holds back the attachable and detachable battery, and the battery case is placed in an inclined posture in which the opening faces the outer edge of the vehicle body and the wall portion faces the interior of the vehicle body, and the lower end (52d) of the wall portion is at a lower position than the lower end (62d) of the opening.

In the rolling compaction vehicle, the battery case in which the attachable and detachable battery is attachably and detachably accommodated is provided at a higher position than the frontward rolling compaction wheel and the rearward rolling compaction wheel. Therefore, the weight of the battery case and the weight of the attachable and detachable battery that is accommodated in the battery case are added to the frontward rolling compaction wheel or the rearward rolling compaction wheel. Consequently, a sufficient load is applied to the road surface (G) via the frontward rolling compaction wheel or the rearward rolling compaction wheel. Therefore, it is easy to rollingly compact or to level the road surface or the like.

Further, the battery case is inclined in a manner so that opening of the battery case faces the outer edge of the vehicle body. Therefore, compared to a situation in which the battery case is not inclined, the opening becomes disposed at a lower position and closer in proximity to the worker. Accordingly, at a time when the worker inserts or removes the attachable and detachable battery from the exterior of the vehicle body into or from the insertion hole of the battery case, the moving distance for lifting up the attachable and detachable battery from the ground surface or the like to the battery case, and the moving distance for lowering the attachable and detachable battery from the battery case to the ground surface or the like are made shorter.

Furthermore, since the battery case is inclined, the insertion hole is also inclined. In this case, a portion of the inner wall bears the weight of the attachable and detachable battery. Therefore, insertion and removal of the attachable and detachable battery is facilitated.

The entirety of the battery case is preferably positioned more inward than the outer edge of the vehicle body. In accordance with this configuration, the rolling compaction vehicle can be made smaller in scale than in a case in which the battery case is extended (exposed) from the outer edge of the vehicle body.

The battery case is preferably disposed at the front of the vehicle body. In this case, the motor is disposed rearward of the battery case. Furthermore, the harness (66) that electrically connects the attachable and detachable battery to the motor is exposed from a portion of the second end of the battery case, the portion facing the motor.

In this case, the battery case is adjacent to the motor. Accordingly, the connector (the second connector 64) provided on the battery case is in close proximity to the battery case. Therefore, the harness can be made shorter in length.

According to the present embodiment, a configuration in which at least two battery cases are provided in the vehicle body is also disclosed. In this case, the at least two battery cases are arranged adjacent to each other along the front-rear direction of the vehicle body. The battery case positioned on the front side is defined as the first battery case (34a), and the battery case positioned rearward of the first battery case is defined as the second battery case (34b). The upper end (120) of the first battery case is at a lower position than the upper end (122) of the second battery case.

The cover member (114) capable of being opened and closed is preferably provided on the vehicle body. The cover member is inclined in accordance with the height difference between the first battery case and the second battery case. By providing the cover member in this manner, and placing the cover member in a closed state, it is possible to protect the two battery cases and the attachable and detachable batteries at the same time. Further, by placing the cover member in an open state, carrying out of the operation of replacing the at least two attachable and detachable batteries is facilitated.

The storage tank (74) for storing a liquid is preferably provided on the vehicle body. In this case, the weight of the storage tank and the weight of the liquid that is stored in the storage tank are added to the frontward rolling compaction wheel or the rearward rolling compaction wheel. Accordingly, it is easy to rollingly compact or to level the road surface or the like.

In this instance, the battery case is placed in an inclined posture. Specifically, the battery case is inclined in a manner so that the opening at the first end is separated further away from the storage tank than the wall portion of the second end is. It may occur that the liquid inside the storage tank splashes out for some reason. Even in the case that such a situation occurs, it is difficult for the liquid that has splashed out to reach the opening of the battery case. This is because the battery case is inclined in a direction in which the opening is separated away from the storage tank.

In the case that the storage tank is provided in the vehicle body, it is preferable that at least a portion of the battery case and a portion of the motor housing (36) in which the motor is accommodated overlap the frontward rolling compaction wheel as viewed in plan. In addition, another portion of the motor housing and at least a portion of the storage tank preferably overlap the rearward rolling compaction wheel as viewed in plan. Consequently, a sufficient load can be applied in a well-balanced manner to both the frontward rolling compaction wheel and the rearward rolling compaction wheel.

The battery case and the storage tank are preferably disposed at positions sandwiching the motor. In accordance with this configuration, the motor is interposed between the battery case and the storage tank. Therefore, the motor housing protects the battery case from liquid that has splashed out from the storage tank. In addition, the battery case is separated away from the storage tank by a large distance. Accordingly, it is difficult for the liquid that has splashed out from the storage tank to reach the battery case. In this manner, the battery case and the attachable and detachable battery that is accommodated in the battery case are prevented from becoming wet by the liquid.

Moreover, it should be noted that the present invention is not limited to the above-described embodiment, and various configurations can be adopted therein without departing from the essence and gist of the present invention.

For example, in the first embodiment as well, two battery cases may be loaded. Further, in the second embodiment, either the first battery case or the second battery case may not be loaded, and the number of battery cases may be one.

Further, it is possible to arrange two or more battery cases in parallel along a vehicle widthwise direction of the hand-guided type vibrating roller or the tandem type road roller.

Furthermore, the riding type rolling compaction vehicle according to the second embodiment is not limited to being a tandem type road roller. As other specific examples thereof, there may be cited a macadam type road roller, a tire type road roller, and the like.

REFERENCE SIGNS LIST

10: hand-guided type vibrating roller
12: loading vehicle body
16: frontward roller
18: rearward roller
34, 34a, 34b: battery case
36: motor housing
40, 40a, 40b: attachable and detachable battery
46, 46a, 46b: first connector
48: case main body
50, 50a, 50b: insertion hole
52, 52a, 52b: bottom wall
54, 54a, 54b: lower wall
60, 60a, 60b: upper wall
62, 62a, 62b: opening
64, 64a, 64b: second connector
66, 66a, 66b: harness
70: motor
72: lid member
74: storage tank
76: closing cap
80: operating handle
82: electrical power switch
100: tandem type road roller
102: riding vehicle body
104: loading section
106: operation unit
108: riding section
112: hinge
114: bonnet
116: inner chamber
120: first upper end
122: second upper end
130: steering handle
132: driver's seat
G: road surface
WK: worker

The invention claimed is:

1. A rolling compaction vehicle equipped with a vehicle body, and a frontward rolling compaction wheel and a rearward rolling compaction wheel that are provided on a lower portion of the vehicle body, the rolling compaction vehicle comprising:

a battery case provided in the vehicle body at a higher position than the frontward rolling compaction wheel and the rearward rolling compaction wheel, and configured to attachably and detachably accommodate an attachable and detachable battery; and a motor provided in the vehicle body and configured to drive the frontward rolling compaction wheel and the rearward rolling compaction wheel with electrical power supplied from the attachable and detachable battery, wherein an insertion hole configured to accommodate the attachable and detachable battery is formed in the battery case, an opening through which the attachable and detachable battery is inserted into the insertion hole or removed from the insertion hole is formed at a first end of the insertion hole, and a second end of the insertion hole is a wall portion configured to block and hold back the attachable and detachable battery, and the battery case is placed in an inclined posture in which the opening faces an outer edge of the vehicle body and the wall portion faces an interior of the vehicle body, and a lower end of the wall portion is at a lower position than a lower end of the opening.

2. The rolling compaction vehicle according to claim 1, wherein the battery case is entirely located more inward than the outer edge of the vehicle body.

3. The rolling compaction vehicle according to claim 1, wherein the battery case is disposed at a front of the vehicle body, and the motor is disposed rearward of the battery case, and a harness configured to electrically connect the attachable and detachable battery to the motor is exposed from a portion of the second end of the battery case, the portion facing the motor.

4. The rolling compaction vehicle according to claim 3, comprising at least two of the battery cases, the at least two battery cases being adjacent to each other along a front-rear direction of the vehicle body, wherein when the battery case positioned on a front side is defined as a first battery case, and the battery case positioned rearward of the first battery case is defined as a second battery case, an upper end of the first battery case is at a lower position than an upper end of the second battery case, the rolling compaction vehicle further comprises a cover member provided on the vehicle body and configured to be opened and closed, and the cover member is provided so as to be inclined in accordance with a height difference between the first battery case and the second battery case.

5. The rolling compaction vehicle according to claim 1, further comprising a storage tank provided on the vehicle body and configured to store a liquid, wherein the battery case is provided in an inclined posture in which the opening is separated further away from the storage tank than the wall portion is.

6. The rolling compaction vehicle according to claim 5, wherein at least a portion of the battery case and a portion of a motor housing in which the motor is accommodated overlap the frontward rolling compaction wheel as viewed in plan, and another portion of the motor housing and at least a portion of the storage tank overlap the rearward rolling compaction wheel as viewed in plan.

7. The rolling compaction vehicle according to claim 5, wherein the battery case and the storage tank are disposed at positions sandwiching the motor.

\* \* \* \* \*